United States Patent
Mehta et al.

(10) Patent No.: US 8,396,759 B2
(45) Date of Patent: Mar. 12, 2013

(54) CONTEXT-INFLUENCED APPLICATION RECOMMENDATIONS

(75) Inventors: Bhaskar Mehta, Zurich (CH); Christian Sonntag, San Francisco, CA (US); Ihar Mahaniok, Zurich (CH)

(73) Assignee: Google Inc., Mountain View, CA (US)

( * ) Notice: Subject to any disclaimer, the term of this patent is extended or adjusted under 35 U.S.C. 154(b) by 349 days.

(21) Appl. No.: 12/818,602

(22) Filed: Jun. 18, 2010

(65) Prior Publication Data

US 2011/0320307 A1  Dec. 29, 2011

(51) Int. Cl.
*G06Q 30/00* (2012.01)
*H04W 24/00* (2009.01)

(52) U.S. Cl. ............. 705/26.7; 705/14.49; 705/14.53; 705/14.55; 705/14.58; 705/14.66; 705/26.9; 705/27.1; 455/456.3

(58) Field of Classification Search ........... 705/26.7, 705/26.9, 27.1, 14.49, 14.53, 14.55, 14.58, 705/14.66, 14.73; 455/456.3
See application file for complete search history.

(56) References Cited

U.S. PATENT DOCUMENTS

| | | | | |
|---|---|---|---|---|
| 8,155,669 | B2 * | 4/2012 | Ziskind et al. | 455/456.3 |
| 2003/0192029 | A1 * | 10/2003 | Hughes | 717/101 |
| 2008/0028389 | A1 | 1/2008 | Genty et al. | |
| 2008/0293375 | A1 * | 11/2008 | Swanburg | 455/405 |
| 2009/0254824 | A1 | 10/2009 | Singh | |
| 2009/0319374 | A1 | 12/2009 | Rybak et al. | |
| 2010/0076849 | A1 | 3/2010 | Bishop | |
| 2010/0262619 | A1 | 10/2010 | Zargahi et al. | |
| 2010/0280892 | A1 | 11/2010 | Uzunalioglu et al. | |
| 2011/0010245 | A1 | 1/2011 | Priebatsch et al. | |
| 2011/0105150 | A1 * | 5/2011 | Moon et al. | 455/456.3 |
| 2011/0167117 | A1 * | 7/2011 | Hart et al. | 709/206 |
| 2012/0123867 | A1 * | 5/2012 | Hannan | 705/14.58 |

OTHER PUBLICATIONS

Anon., "MobileIron Announces Secure IT Management App for iPhone Now Available on App Store," Business Wire, Sep. 22, 2009. 2 pages.

* cited by examiner

*Primary Examiner* — Nicholas D Rosen
(74) *Attorney, Agent, or Firm* — Fish & Richardson P.C.

(57) ABSTRACT

Methods, systems, and apparatus, including computer programs encoded on a computer storage medium, for recommending content based on context such as location. In one aspect, a method includes receiving data that references a location of a mobile device, selecting, from among multiple, different applications that are available in an online application marketplace, one or more of the applications that are relevant to the location, and providing, by a recommendation server, a recommendation to the mobile device, where the recommendation identifies the one or more applications as applications that the user is likely to be interested in purchasing or downloading.

20 Claims, 7 Drawing Sheets

CONTEXT-INFLUENCED APPLICATION RECOMMENDATIONS

BACKGROUND

The present disclosure relates to mobile device applications and, in one particular implementation, to recommending software applications to a user of a mobile device based on context such as the location of the mobile device.

Mobile computing devices (or simply "mobile devices") may run a variety of software applications that extend existing device capabilities and that add new capabilities. Many types of applications are generally available, such as applications for information retrieval, communications, and entertainment. Applications may be created by mobile device manufacturers and/or third parties (e.g., application developers), and may be pre-installed, or may be acquired later by device users.

Users may discover new applications through an interface associated with an on-line application marketplace, by browsing a catalog of available applications. Additionally, information about new applications is generally available through advertising, industry reviews, "top 10" and "best" lists, and through word-of-mouth referrals. Upon learning of a new application, users may obtain, install, and use full versions of the applications, or user may access demonstration versions of the application that allow the user to try the application out with or without purchasing. Over time, users may keep applications, upgrade applications (e.g., from a demonstration version to a full version), and may delete applications that are no longer wanted.

SUMMARY

According to one innovative aspect of the subject matter described by this specification, a recommendation engine identifies applications that a user of a mobile device may enjoy or may be interested in based, among other factors, on the current geographic location of the mobile device. For instance, the recommendation engine may recommend that a user who is traveling near a beach download a "surf report," or "UV index" application, or may recommend that a user who is traveling through a foreign country download a language-specific language translation application. In generating a recommendation, the recommendation engine may take into account applications that other users in that geographic location have loaded, rated, un-installed, or have otherwise used.

Another innovative aspect of the subject matter described in this specification may be embodied in methods that include the actions of receiving, by a recommendation server, data that references a location of a mobile device, selecting, by the recommendation server, one or more applications that are relevant to the location, and providing, by the recommendation server, data that references the one or more applications to the mobile device.

Another innovative aspect of the subject matter described in this specification may be embodied in methods that include the actions of receiving data that references a location of a mobile device, selecting, from among multiple, different applications that are available in an online application marketplace, one or more of the applications that are relevant to the location, and providing a recommendation to the mobile device, where the recommendation identifies the one or more applications as applications that the user is likely to be interested in purchasing or downloading.

Other embodiments of these aspects include corresponding systems, apparatus, and computer programs, configured to perform the actions of the methods, encoded on computer storage devices.

These and other embodiments may each optionally include one or more of the following features. For instance, receiving data that references a location of a mobile device further includes receiving, by the recommendation server, a request for a recommended application from the mobile device; the actions further include receiving user profile data that corresponds to a user of the mobile device, and filtering the one or more applications based on the user profile data, where providing data that references the one or more applications further includes providing data that references the filtered one or more applications; filtering the one or more applications further includes ranking the one or more applications based on category preferences referenced by the user profile data; filtering the one or more applications further includes removing the one or more applications that are currently installed on the mobile device, or that have been previously installed on the mobile device and subsequently removed by the user of the mobile device; the actions further include selecting one or more applications that correlate to applications that are already installed on the mobile device, and selecting one or more applications that are relevant to the location further includes selecting, from among the one or more applications that correlate to applications that are already installed on the mobile device, the one or more applications that, for other users in the location, have an aggregated popularity score above a predetermined threshold; providing, by the recommendation server, data that references the one or more applications to the mobile device further includes providing links for purchasing or downloading one or more of the applications; and/or the actions further include receiving, by the recommendation server, data that references a characteristic, configuration, or capability of the mobile device, and selecting one or more applications that are relevant to the location further includes selecting one or more applications that are relevant to the location and the characteristic, configuration, or capability.

Particular embodiments of the subject matter described in this specification may be implemented so as to realize one or more of the following advantages. By providing current and personalized recommendations to device users, the users may save time and money, and users can discover new applications that they may not have been aware of. Users are able to quickly discover potentially relevant applications, and are unlikely to discard such applications upon installation. Some applications are more relevant to users of a certain demographic group or users at a particular location as compared with users of another demographic group or location, and identifying such applications may be beneficial. Additionally, application providers are enabled to increase customer satisfaction and customer retention, as device users may purchase applications with increased confidence.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
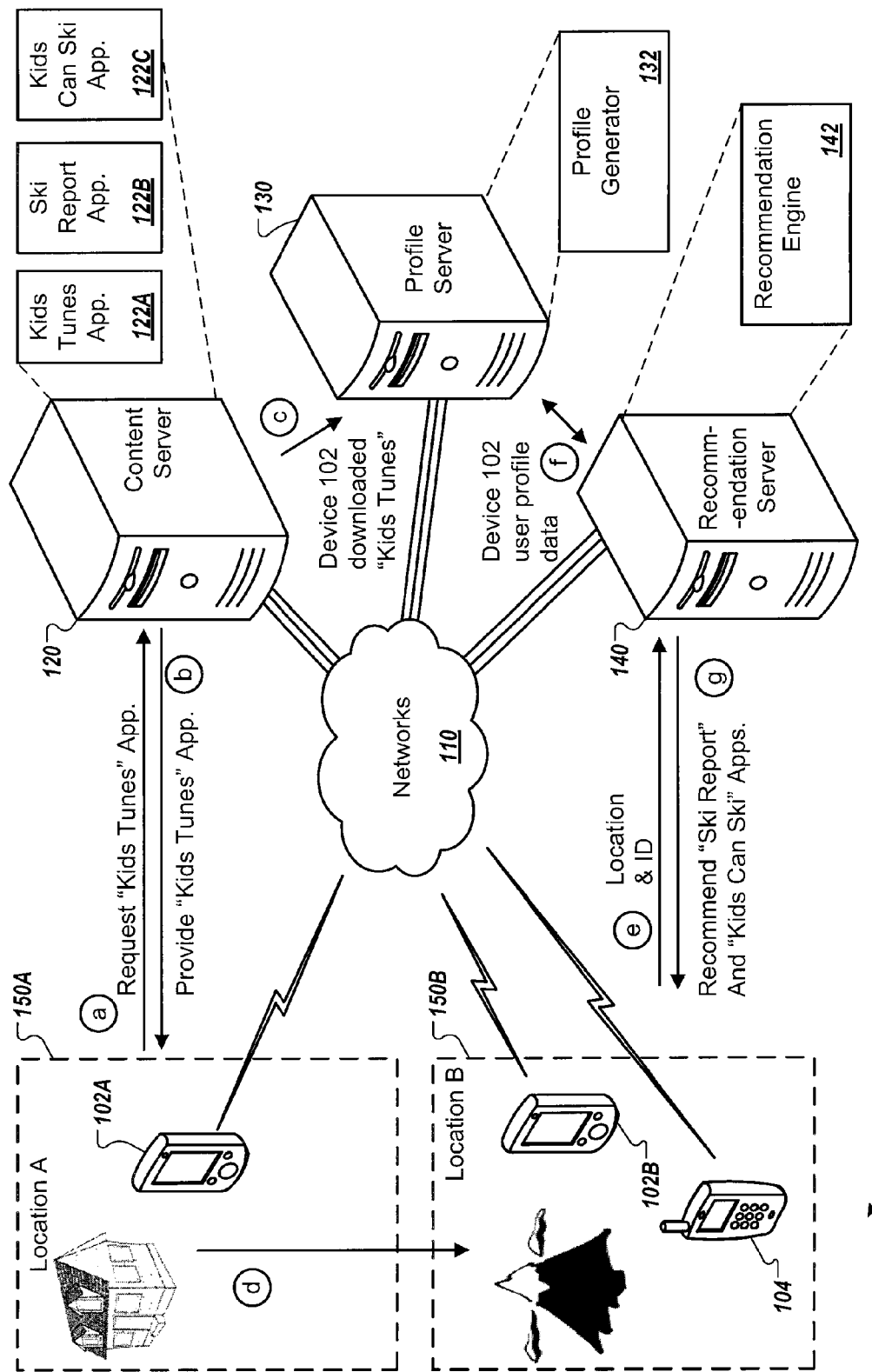
FIG. 1 shows an exemplary system for providing recommendations to device users.

FIG. 1 shows an exemplary system 100 for providing recommendations to device users. In general, the system 100 includes multiple devices, such as a device 102 and a device 104, and one or more servers (e.g., servers 120, 130 and 140) for providing content, maintaining user profiles, and providing recommendations. The devices may be mobile computing devices, fixed or stationary computing devices, or other types of devices that include one or more processors. The recommendations may recommend content (e.g., applications, music, video, images, books, articles, and the like) that a user of a device may enjoy or find interesting.

This specification describes systems and techniques for recommending content in general, and applications in particular, to device users based on one or more factors, including the user's personal history, the history of other users, trends, and device location. Such techniques may include analyzing user-related factors, such as a mobile device user's installation history and location, relative to community-related factors, such as the installation history of a user population. Additionally, such techniques may include providing information referencing recommended content to device users.

The devices 102, 104 may each be a mobile computing device, such as a smartphone, a personal digital assistant (PDA), a music player, a tablet computer, an e-book reader, or a similar device. The devices 102, 104 may be configured to receive recommendations, software applications, and other content from various sources over wireline or wireless connections to networks 110. The networks 110 may include a private network such as an intranet, a public network such as the Internet, or any appropriate combination thereof.

The devices 102, 104 may use one or more wireless protocols, such as EDGE (Enhanced Data rates for GSM Evolution), CDMA (Code Division Multiple Access), 802.11, or other protocols for sending and receiving data. Upon receiving content, the devices 102, 104 may store the content in memory. Additionally, the devices 102, 104 may present the content to device users or may execute software applications using one or more included processors.

Content may be provided by a content server 120 in response to requests for the content from devices. The content server 120 may be implemented using one or more computer servers (e.g., a server farm) that hosts and provides content to devices (e.g., devices 102, 104) over the networks 110. The content server 120 provides an on-line application marketplace that offers a variety of applications (e.g., applications 122A, 122B, and 122C) for download to devices. The applications 122A-C may be categorized (e.g., sports, travel, finance, and the like) to enable a user to browse the application marketplace and to discover potentially relevant applications for download.

A profile server 13, which may be implemented using one or more computer servers, maintains user profile data associated with device users (e.g., users of the devices 102, 104). The profile server 130 includes one or more processors configured to execute computer code associated with a profile generator 132.

Portions of the user profile data stored by the profile server 130 may be manually provided by users or, when the user opts to participate, the user profile data may be automatically inferred or determined. In some implementations, one or more items of user profile data may be user supplied through direct entry or through collection from other user-supplied profile data. For example, device users may enter demographic information such as age, gender, marital status, income, level of education, and the like, using a device application configured to provide data to profile server 130 or some intermediary system. In some implementations, one or more items of user profile data may be inferred based on usage, such as device, application, and/or content usage. For example, profile generator 132 may be configured to generate one or more items of profile data based on such factors as application management (e.g., dates and times of purchase, installation, deletion, and upgrade), and based on various application acquisition methods (purchasing, downloading of trial versions, downloading of free versions and the like) and application categories (e.g., sports, travel, finance, and the like).

User profile data generated by profile generator 132 may be heuristically determined. For instance, if a particular device user is determined to primarily use sporting and financial applications, the profile generator 132 may infer that the user is associated with one particular demographic group over another. User profile data generated by the profile generator 132 may be stored in a user profile maintained for the users of the devices by the profile server 130. The profile server 130 and the profile generator 132, for example, may associate provided or inferred demographic information with a particular user or user device.

In some cases, the profile generator 132 may generate user profile data. For example, location data may be provided by devices that incorporate position or location sensing technology (e.g., Global Positioning Service) or by communications service providers with whom the devices are registered. Location data also may be explicitly provided by a device user, e.g., in response to a prompt. In some implementations, location data (and/or other demographic data) may be inferred, based at least in part on one or more installed applications. For example, the relevance of particular applications may be determined to be linked, at least in part, to one or more locations or regions. For instance, an application for locating restaurants may be preferred by users of a particular demographic in London, and another application for locating restaurants may be preferred by users of a similar demographic in Paris.

The profile generator 132 may also use device-based data to generate user profile data. For example, when the user agrees to provide such information, interaction data (e.g., data related to phone calls, messages, e-mails, and the like) may be used to augment data that may be included in the corresponding user's profile. In some implementations, the time and frequency of communications may be used as factors, e.g. to identify a pattern of usage from which data may be extracted, such as to infer whether the user is a student or a commuter. In some implementations, social interaction data (e.g., data related to one or more people involved in such communications) may be used. As another example, device usage data may be used in generating user profile data. For example, data related to the time and frequency of use of particular device peripherals (e.g., cameras, headphones, and the like), and applications (e.g., media players, installed applications, and the like) may be used. A user determined to frequently use device headphones and a media player and to occasionally use text messaging during a particular time period (e.g., from 8:00-8:30 AM, Monday through Friday) may be identified as a likely commuter that uses mass transportation.

Data related to device and application usage, and data related to device location may be provided to the profile server 130 using a variety of techniques. The profile server 130 may obtain such data through polling or by receiving reports. For example, by polling the content server 120 at periodic intervals (e.g., hourly, daily, or weekly), the profile server 130 may retrieve data related to the download of one or more applications by one or more user devices. As another example, data related to application management (e.g., dates and times of application purchase, installation, deletion, and upgrade), and other device, content, and application usage data may be periodically provided by the devices 102, 104 to the profile server 130.

Application recommendations may be provided by a recommendation server 140. The recommendation server 140 may be implemented using one or more computer servers for recommending content and applications to users of mobile devices (e.g., devices 102, 104). In the present example, the recommendation server 140 includes one or more processors configured to execute computer code associated with a recommendation engine 142. The recommendation engine 142 may generate recommendations based at least in part on a profile (e.g., a profile generated by the profile generator 132) associated with a device user requesting one or more recommendations. Further, the recommendation engine 142 also may generate recommendations based at least in part on detected patterns relating to applications, e.g. installation, deletion, and/or usage, over a population of device users. For example, the recommendation engine 142 may determine common patterns relevant to similar users (e.g., users with similar demographics or application preferences), and may provide recommendations based on the determined patterns. In some implementations, the profile generator 132 and the recommendation engine 142 may be hosted by a common server or virtual server.

For purposes of illustration, a series of sample interactions are described here for providing recommendations to the mobile device 102, illustrated as states "A" to "G". States "A" to "G" may occur in the illustrated sequence, or they may occur in a sequence that is different than is illustrated. Although the sample interactions involve providing application recommendations, the system 100 may provide recommendations for any sort of content, including music, video, images, books, or articles.

During state "A", a user of the mobile device 102 establishes communication with the content server 120. The content server 120 may include an application marketplace enabling device users to purchase and download applications, such as applications 122A, 122B, and 122C. While located at an initial location 150A ("Home"), the user of the device 102 (here represented as device 102A) may download application 122A ("Kids Tunes") over the network 110. During state "B," the application 122A is downloaded and installed on the device 102.

During state "C," data associated with the acquisition of application 122A (e.g., purchase, download, and/or installation) is provided to the profile server 130. In some implementations, the profile server 130 may obtain such data from the device 102. In other implementations, the profile server 130 may obtain the data from the content server 120, e.g., based upon the initiation or completion of downloading.

Additionally, the profile generator 132 may generate one or more items of profile data corresponding to the user of the mobile device 102. For example, since the application 122A is related to parenting and toddlers, the profile generator 132 may determine that the user of the device 102 has one or more small children.

During state "D", the mobile device 102 moves from location 150a ("home") to a different location 150B ("mountain"). During state "E", the user of the mobile device 102 (here represented as device 102B) requests application recommendations. For example, the recommendations request may be provided via an application executed by the mobile device 102 configured to communicate with the recommendation server 140, or may be provided by an application marketplace associated with the content server 120, or may be provided via another such mechanism.

During state "F", the recommendation server 140 requests and receives user profile data associated with the user of the mobile device 102 from the profile server 130 and/or from the mobile device 102. The recommendation engine 142 may use the profile data to generate one or more recommendations, e.g. by comparing the profile data with aggregated information relating to a population of device users. For example, the recommendation engine 142 may determine that users having a similar profile have frequently downloaded application 122B. Additionally or alternatively, recommendation engine 142 may determine that device users, e.g. including mobile device 104, in a region that includes location 150B have frequently downloaded application 122C.

Based on its analysis, the recommendation engine 142 may then provide, during state "G", one or more application recommendations to mobile device 102. The recommendation engine 142 may, for example, recommend the "ski report" application 122B, based on the "mountain" location associated with the device 102B, or may recommend the "kids can ski" application 122C based on the "mountain" location associated with the device 102 and the user profile data associated with the device 102 or the user of the device 102. The recommended applications are displayed to the users of the devices 102, 104, for possible selection and purchase.

Figure 2:
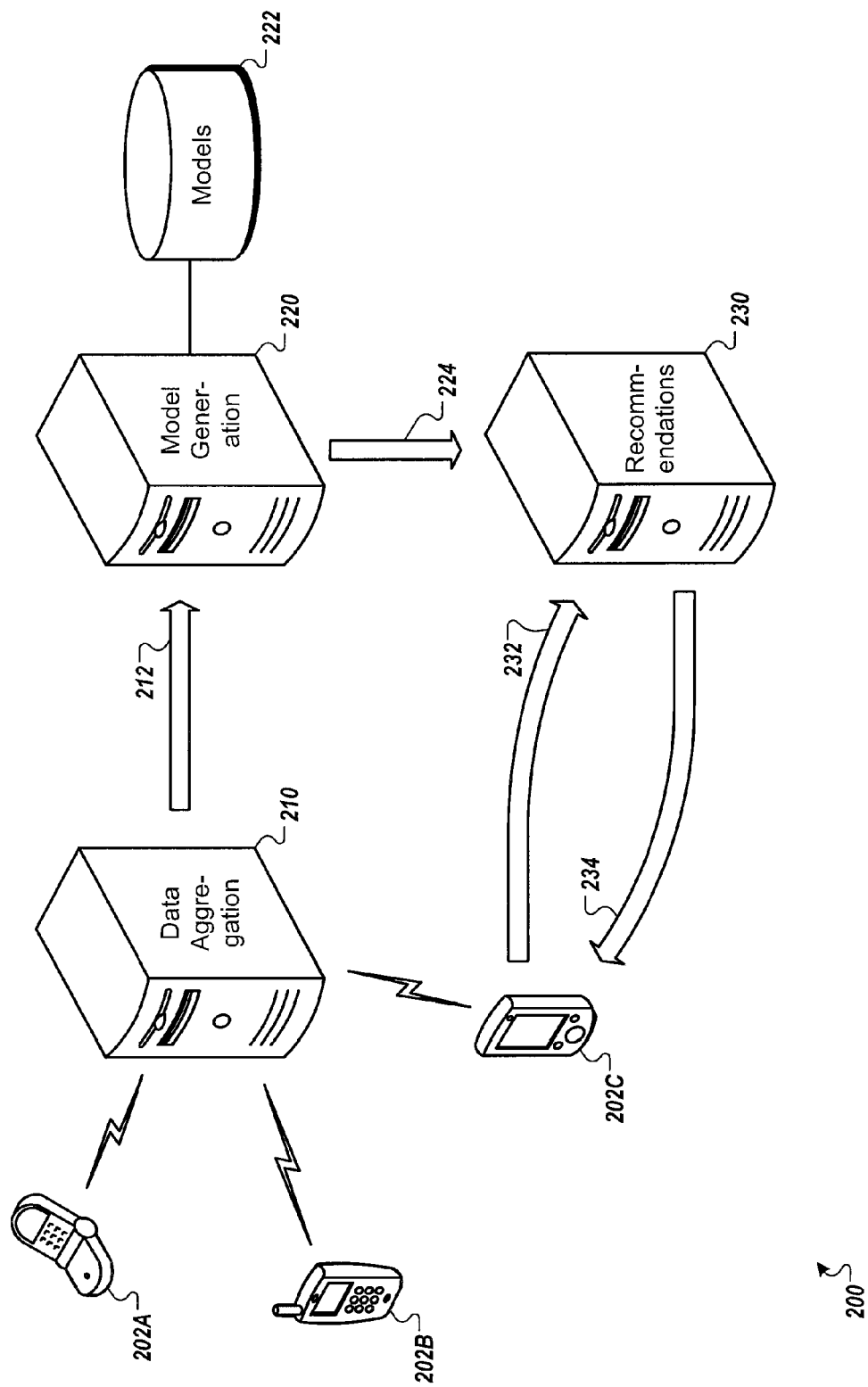
FIG. 2 shows an exemplary system for aggregating information about devices and device users, for detecting relevant usage patterns, and for providing recommendations.

FIG. 2 shows an exemplary system 200 for aggregating information about devices and device users, for detecting relevant usage patterns, and for providing recommendations. Similar to recommendations provided by the system 100 (shown in FIG. 1), recommendations provided by the system 200 may be directed to any type of content (e.g., music, video, images, books, articles, and the like). In general, the system 200 includes multiple mobile devices, such as mobile devices 202A, 202B, and 202C. Each of the mobile devices 202A-C, for example, may be any sort of mobile computing device, such as a smartphone, a PDA, a music player, or the like. Similar to the system 100, for example, the mobile devices 202A-C may be configured to communicate with various servers (and each other) using wireless protocols and/or the Internet.

The mobile devices 202A-C may provide data to a data aggregation server 210. For example, provided data may be related to device usage, location, and/or applications. Device usage data, for example, may include data related to the use of devices and the use of device peripherals, such as communications hardware and software, cameras, speakers, and the like. Location data, for example, may include data related to device location and/or location changes. For example, location data may be determined and provided by mobile devices incorporating location sensing technology or by communications service providers with whom the mobile device registers.

In some implementations, the location data may be at a particular granularity, such as the granularity of a country, city, neighborhood, or the like. Application data, for example, may include data related to the application (e.g., title, category, package information, producer or developer information, and the like), data related to application use (e.g., purchase date/time, upgrade date/time, installation date/time, un-installation date/time, usage times, usage frequencies, and the like), and data related to application acquisition methods (e.g., installed purchased version, installed trial version, installed free version etc.). For example, the devices 202A-C may be configured to provide data related to currently installed and/or previously installed applications.

In some implementations, the devices 202A-C may provide data related to user ratings associated with currently installed and previously installed applications. For example, one or more of the devices 202A-C may include an interface enabling device users to rate (e.g., 1 to 5 stars, thumbs-up or thumbs-down, or the like) applications.

Device data (e.g., data associated with the mobile devices 202A-C) may be provided in response to predetermined events. For example, upon installing an application, data related to the application may be provided to the data aggregation server 210. In some implementations, application data may be provided by a device (e.g., one of the mobile devices 202A-C) and/or by an application marketplace (e.g., an application market place hosted by the content server 120, shown in FIG. 1) serving the application.

In some implementations, data may be provided upon uninstalling an application. For example, data associated with installation and un-installation times may be provided in addition to application data. In some implementations, data may be provided upon a device user rating an application. For example, application data and associated ratings data may be provided. In some implementations, location data may be provided in response to a change in location. For example, upon moving to a different location (e.g., country, city, neighborhood, or some other location), location data associated with any of the devices 202A-C may be provided to the data aggregation server 210.

In some implementations, device data may be provided periodically. For example, each of the mobile devices 202A-C may provide data at a particular time interval (e.g., hourly, daily, weekly, or some other such interval). Data may be provided by the devices 202A-C, for example, or by one or more intermediate servers or devices (e.g., application marketplaces, network service providers, or the like), or via polling by the data aggregation server 210.

The data aggregation server 210 may receive information from a population of users (e.g., users of the mobile devices 202A-C), and may aggregate relevant data. For example, if additional information about a particular device application is available from another source (not shown), such as descriptive information, category information, information about applicable versions (e.g., full, trial, free, etc.), information about applicable languages and locales, or information about the application author or developer (e.g., reputation, general quality of applications, etc.), such information may be gathered by the data aggregation server 210. In some implementations, recent (e.g., one week, one month, two months, or some other time period) data gathered from the population of users or from another source may be assigned a higher weight as compared with less recent data.

As shown by arrow 212, device usage data, location data, and/or application data may be provided by the data aggregation server 210 to a model generation server 220. In some implementations, the model generation server 220 may poll data at predetermined intervals (e.g., once per week, once per day, once per hour, or some other interval), or may receive data in real-time. Based at least in part on data provided by the data aggregation server 210, for example, the model generation server 220 may generate multiple user profiles (e.g., similar to the profile generator 130, shown in FIG. 1). In some implementations, the user profiles may be used by the model generation server 220 to build one or more offline models, by detecting patterns relevant to application usage and/or installation history over a population of users. In some implementations, model data associated with such patterns (and/or user profile data) may be stored by a model data store 222.

Generally, model data may be used to determine similarity and/or popularity of applications. For example, the model generation server 220 may determine the similarity of applications (or groups of applications) to each other. Popularity of applications, for example, may be determined in relation to multiple factors. For example, patterns related to overall popularity, trending popularity, popularity by location, popularity by demographic, and the like may be determined. In some implementations, application similarity and popularity may be represented by applied scores or rankings.

As shown by arrow 224, model data and/or application ranking data may be provided by the model generation server 220 to a recommendation server 230. In some implementations, the recommendation server 230 may poll for data at predetermined intervals (e.g., once per day, once per hour, or some other interval), or may receive data in real-time. Based at least in part on model data and/or application ranking data provided by the model generation server 220, for example, and based at least in part on device usage, application, and location data associated with a device user, the recommendation server 230 may provide application recommendations (e.g., similar to the recommendation server 140, shown in FIG. 1).

As shown by arrow 234, for example, the mobile device 202C may request application recommendations from the recommendation server 230. In some implementations, the mobile device 202C may provide current or recent device usage, application, and location data. In some implementations, the mobile device 202C may provide an identifier enabling the recommendation server 230 to retrieve a user profile associated with the mobile device 202C from the model generation server 220. For example, the user profile may include such device usage, application, and location data associated with a user of the mobile device 202C over a period of time.

Based on current, recent, and/or historical user profile data, for example, the recommendation server 230 may determine and rank potentially relevant applications for the user of the mobile device 202C. For example, popular application categories for users associated with similar demographics and/or similar locations as the user of the mobile device 202C may be determined, and the rankings of such applications may be fine-tuned based on preferences of the user.

As shown by arrow 234, for example, application recommendations may be provided by the recommendation server 230 to the mobile device 202C. For example, the recommendations may include links enabling the device user to download and install recommended applications. In some implementations, the recommendations may include such information as titles, descriptions, and images. In some implementations, the recommendations may be ranked by likely relevance to the user.

Figure 3:
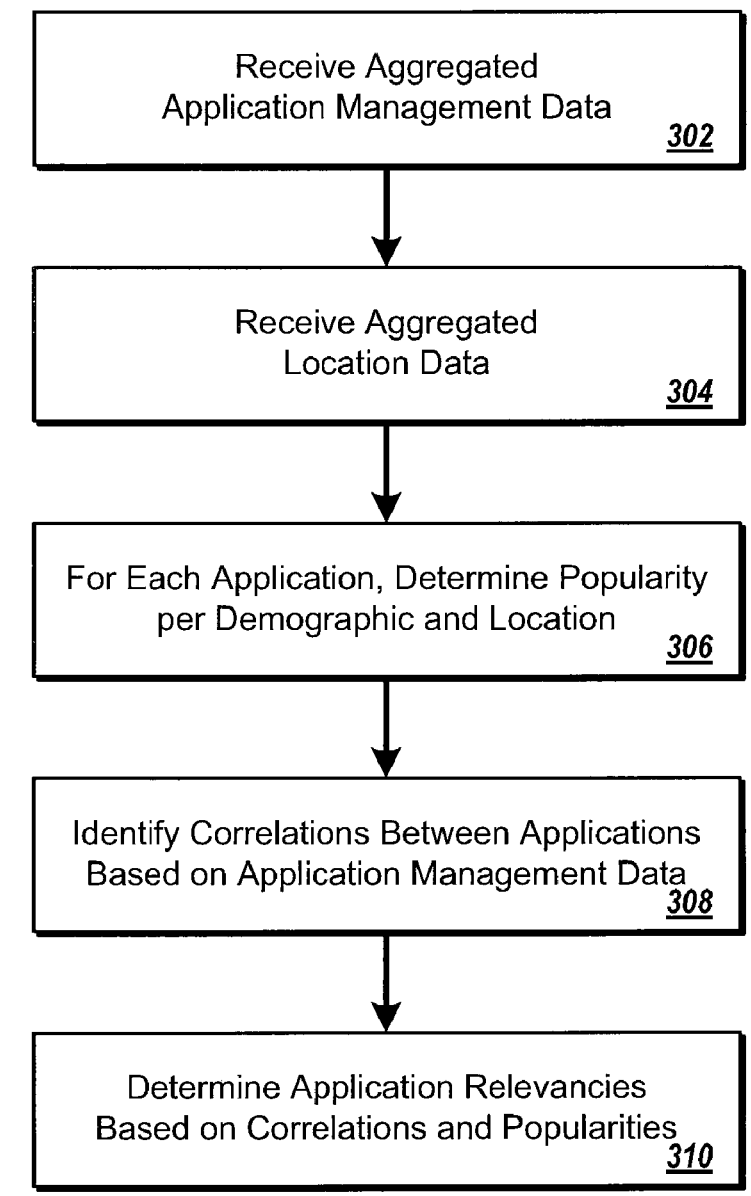
FIG. 3 is a flowchart illustrating an example process for determining application relevancies.

FIG. 3 is a flowchart illustrating an example process 300 for determining application relevancies. For example, mobile device applications may be determined by the process 300 to be relevant to users of particular demographics, users at particular locations, and/or to users of particular applications or application categories. In some implementations, actions represented in the flowchart may be performed by data processing apparatus included in the system 200 as shown in FIG. 2. The following description refers to elements of the system 200, for clarity, although other systems and apparatus (e.g., data processing apparatus included in the system 100 as shown in FIG. 1) may be used.

As shown in FIG. 3, aggregated application management data is received (302). For example, application management data may include data related to applications and application installation/acquisition history. Application-related data may include such data as categorization data (e.g., as supplied by an application creator), pricing data, and user rating data, for example. Data related to application installation and/or acquisition may include installation counts per application, for example.

As another example, installation (and potential un-installation data) may be used to determine the "stickiness" of a particular application (e.g., a likelihood or average period of time that an application remains in use by a user). In some implementations, user demographics may be inferred, based at least in part on application data and installation/acquisition data. For example, users having frequently installed (and used) applications associated with a particular category may be assumed to belong to a particular demographic. In some implementations, application management data may be aggregated by the data aggregation server 210 and provided to the model generation server 220.

Aggregated location data is received (304). For example, data related to the geo-location of mobile computing devices may be aggregated and analyzed to determine a probable location of a user of the mobile device. In some implementations, such aggregated location data may also be used to infer certain user demographic information, such as whether the user is a commuter or a regular traveler. For example, a device user determined to be located in one city or neighborhood during the day and a different city or neighborhood during the night may be assumed to be a commuter. As another example, a device user determined to be generally located in one country, but occasionally located in one or more different countries may be assumed to be a regular traveler. In some implementations, receiving location data (304) may be combined with receiving application management data (302). In some implementations, location data may be aggregated by the data aggregation server 210 and provided to the model generation server 220.

Application popularity is determined per demographic and location (306). For example, based on such factors as aggregated installation counts and user ratings, application popularity for each application may be calculated and scored in relation to each demographic and/or location. In some implementations, application "stickiness" may be used as a factor in determining application popularity. For example, applications determined to be generally uninstalled shortly after installation may be assumed to have a lesser popularity than applications determined to be installed and generally not subsequently removed.

In some implementations, the recency of application installation data may be used to determine trending popularity. For example, application popularity scores or rankings may be adjusted to favor recently popular applications (e.g., applications installed within the previous two weeks, within the previous two months, or some other such time period). In some implementations, popularity scores may be generated and maintained by the model generation server 220.

Correlations between applications are determined (308). In some implementations, based on application management data, correlation scores for an application pairing may be determined. For example, if it is determined that users who have installed a particular mapping application have also generally installed a particular travel application, a relatively high correlation score may be assigned for the pair of applications. In some implementations, certain correlation scores may be discounted. For example, if a particular application is determined to be pre-installed with a particular device, correlation scores between the pre-installed application and other applications may be discounted. In some implementations, determining correlations between applications may be performed by the model generation server 220.

Application relevancies are determined (310). For example, based at least in part on determined correlations between applications (308), and based at least in part on application popularity (306), for each application, a list of potentially relevant applications may be generated. In some implementations, similarity scores may be assigned to application pairs by weighting correlation and popularity factors. For example, correlations and various factors may be considered equally, or weighed to reflect an increased or decreased importance of one or more factors. Such weights, for example, may be based on empirical testing, and may be included in a statistical model. In some implementations, a ranked list of relevant applications may be generated for each application, based at least in part on assigned similarity scores. In some implementations, determining application relevancies (310) may be combined with determining correlations (308). In some implementations, determining application relevancies may be performed by the model generation server 220.

Figure 4:
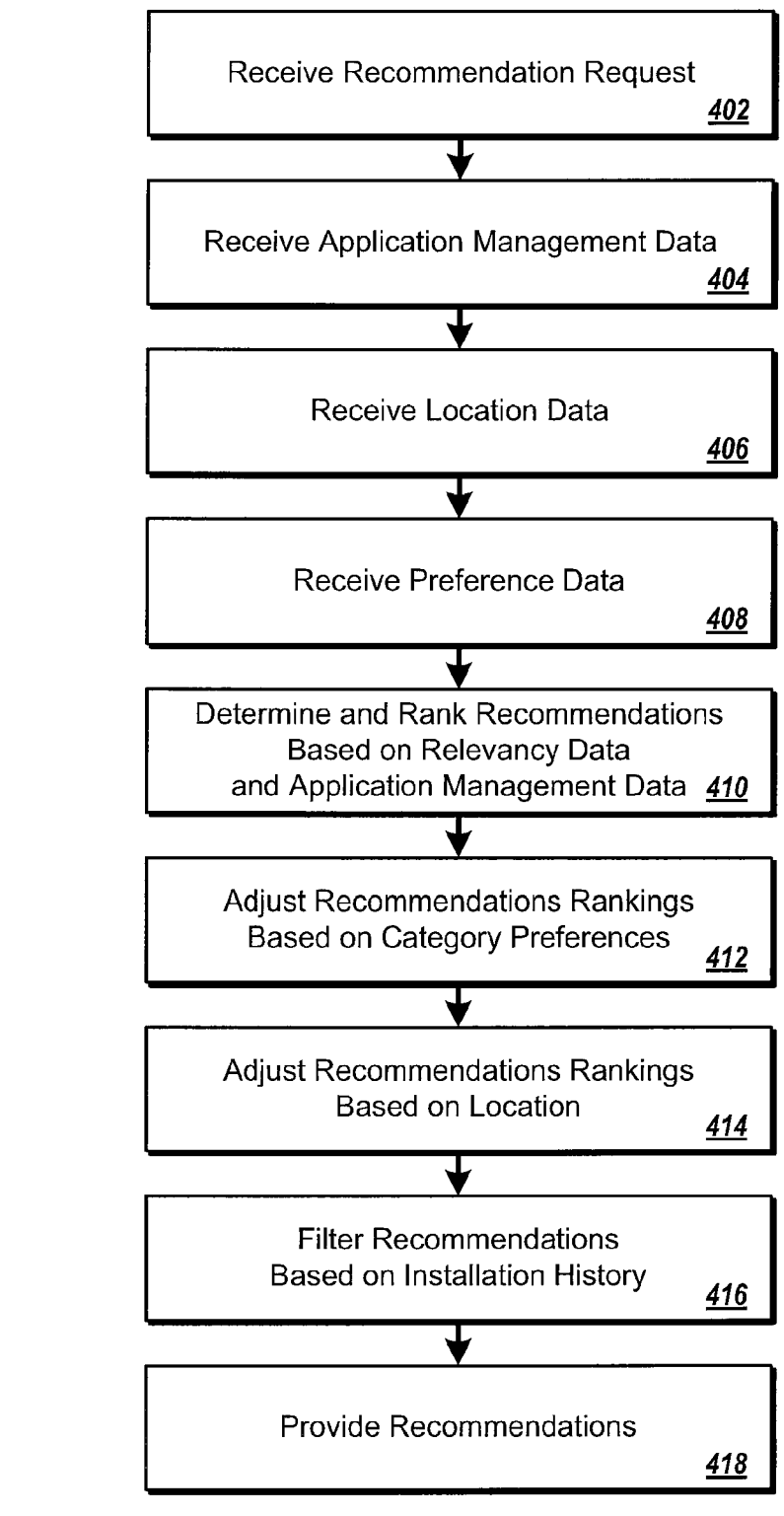
FIGS. 4 and 5 are flowcharts illustrating example processes for ranking and providing application recommendations.

FIG. 4 is a flowchart illustrating an example process for ranking and providing application recommendations. In some implementations, actions represented in the flowchart may be performed the recommendation server 230 included in the system 200 as shown in FIG. 2. The following description refers to elements of the system 200, for clarity, although other systems and apparatus (e.g., data processing apparatus included in the system 100 as shown in FIG. 1) may be used.

As shown in FIG. 4, a recommendation request received (402). For example, the recommendation server 230 may receive a recommendation request from any of the mobile devices 202A-C. In some implementations, the request may be triggered by a device user interacting with a system or application, such as an application marketplace.

Application management data is received (404), and location data is received (406). In some implementations, application management data and location data associated with a requesting device (e.g., any of the mobile devices 202A-C) may be provided by the device with a recommendation request. In some implementations, application management data and location data may be retrieved from the model generation server 220 (as shown in FIG. 2) or the profile server 130 (as shown in FIG. 1). For example, profile data associated with device users may be maintained and updated (e.g., during installs, uninstalls, etc.) and may be accessed for providing customized recommendations. Similarly, location data associated with device users may be maintained and updated. For example, any of the mobile devices 202A-C may periodically provide geo-location data, or a communications provider may provide such data (e.g., by indicating a base station to which the device is connected).

Preference data (or "relevancy data") is received (408). In some implementations, the preference data may be generated by a process such as the process 300. For example, such data may be generated offline and provided to the recommendation server 230 at a predetermined rate (e.g., once per hour, once per day, once per week, etc.), or such data may be provided in real-time. In some implementations, ranked lists of relevant applications may be provided to the recommendation server 230, and the lists may be used to rank and provide application recommendations to a device user.

Recommendations are determined and ranked (410). For example, based at least in part on the received relevancy data and on application management data associated with the device user, an initial ranked list of application recommendations may be generated. Based on a list of applications installed on a user's device, for example, potentially relevant applications may be determined (e.g., by comparing application similarity scores generated by the process 300, at 310), and the applications may be sorted by relevance. In some implementations, the position of a particular application in the ranked list may be adjusted based on a variety of factors.

In one example, if the application is determined to be relevant to multiple applications installed on the user's device, the position of the application in the ranked list may be raised. If a particular mapping application is determined to be ranked twentieth on the relevancy list (or correlation list) for a particular travel application, and is determined to be ranked twenty-fifth on the relevancy/correlation list for a particular dining application, and if both the travel application and the dining application are installed on the user's device, the mapping application is likely to be raised in ranking above an application that is solely ranked fifteenth on the relevancy/correlation list for the travel application.

Recommendations rankings are adjusted based on category preferences (412). For example, one or more categories preferred by the user may be determined (e.g., based on a ratio of installed applications included in the category to total applications), and the ranked list may be adjusted to more favorably weight applications included in the category. Recommendations rankings are adjusted based on location (414). For example, certain applications may be determined to have a higher popularity among users in a particular location as generally compared with users of other locations.

Recommendations are filtered based on application history (416). For example, certain applications may be removed from the ranked list of recommendations, such as currently installed applications, paid versions of free applications, and applications that had been previously installed and subsequently removed by a user.

In some implementations, additional or other factors may be used to adjust rankings and/or filter recommendations. For example, applications associated with a developer or company having a favorable rating (e.g., a community rating, or a developer or company that the user has explicitly identified in their user profile information as being a preferred provider, or that has a high install ratio) may be ranked higher than applications associated with a developer or company having an unfavorable rating. As another example, certain application categories (e.g., content that is not suitable for children) may be filtered from a list of recommended applications. As another example, applications developed for a language other than a language favored by a device user may be filtered from a list of recommended applications.

Application recommendations are provided to the device user at 418. In some implementations, a subset of the ranked list of recommendations may be initially provided. For example, several (e.g., 5, 10, 50, etc.) recommendations may be initially provided, and a mechanism (e.g., a link) may be provided to the user such that the user may request additional recommendations.

Figure 5:
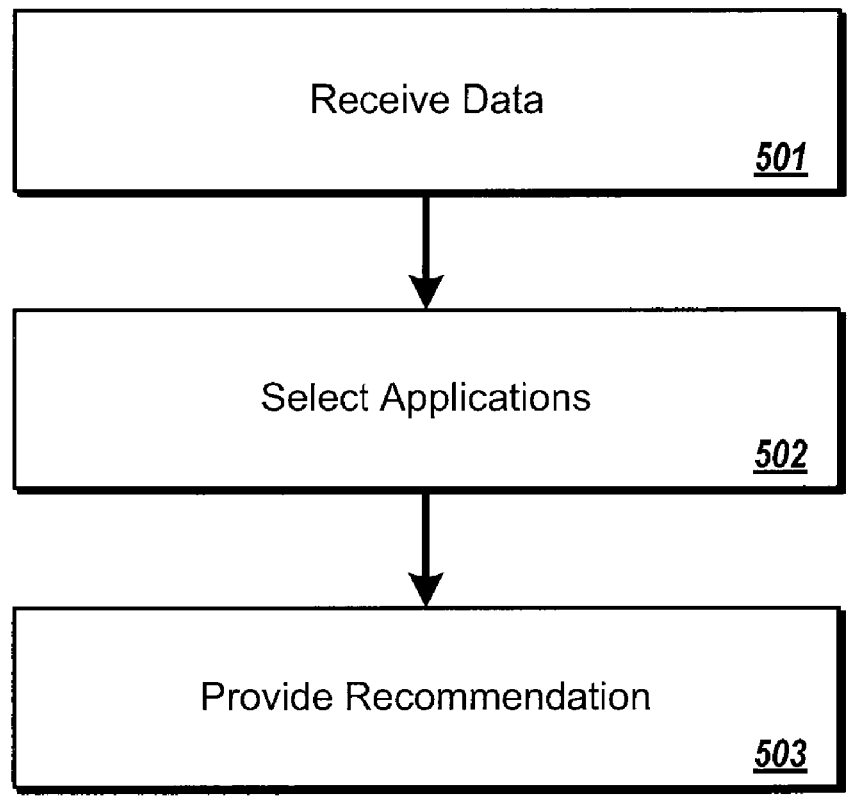

FIG. 5 is a flowchart illustrating an example process 500 for ranking and providing application recommendations. Briefly, the process 500 includes receiving data that references a location of a mobile device, selecting, from among multiple, different applications that are available in an online application marketplace, one or more of the applications that are relevant to the location, and providing, by a recommendation server, a recommendation to the mobile device, wherein the recommendation identifies the one or more applications as applications that the user is likely to be interested in purchasing or downloading.

In more detail, when the process 500 begins, a recommendation engine receives data that references a location of a mobile device (501). The data may be included in a request for a recommended application that is received from the mobile device. The data may also include user profile data that corresponds to a user of the mobile device, or device data that references a characteristic or capability of the mobile device, such as display characteristics (e.g., screen size, resolution, graphics capabilities), processing, or memory characteristics, or device configuration data.

The recommendation server, from among multiple, different applications that are available in an online application marketplace, one or more of the applications that are relevant to the location (502). The one or more applications may be filtered based on user profile data, or based on the applications that are already installed on the mobile device. Filtering the applications may include ranking the one or more applications based on category preferences referenced by the user profile data, or removing the applications that are currently installed on the mobile device, or that have been previously installed on the mobile device and subsequently removed by the user. The applications may be selected to exclude those applications that are incompatible with the characteristics or capabilities of the mobile device.

The recommendation server provides a recommendation to the mobile device, where the recommendation identifies the one or more applications as applications that the user is likely to be interested in purchasing or downloading (503), thereby ending the process 500. The recommendation may be included in code (e.g., HyperText Markup Language (HTML) code or eXtensible Markup Language (XML) code) that, when invoked by the mobile device, causes the mobile device to display links for purchasing or downloading the applications.

Figure 6:
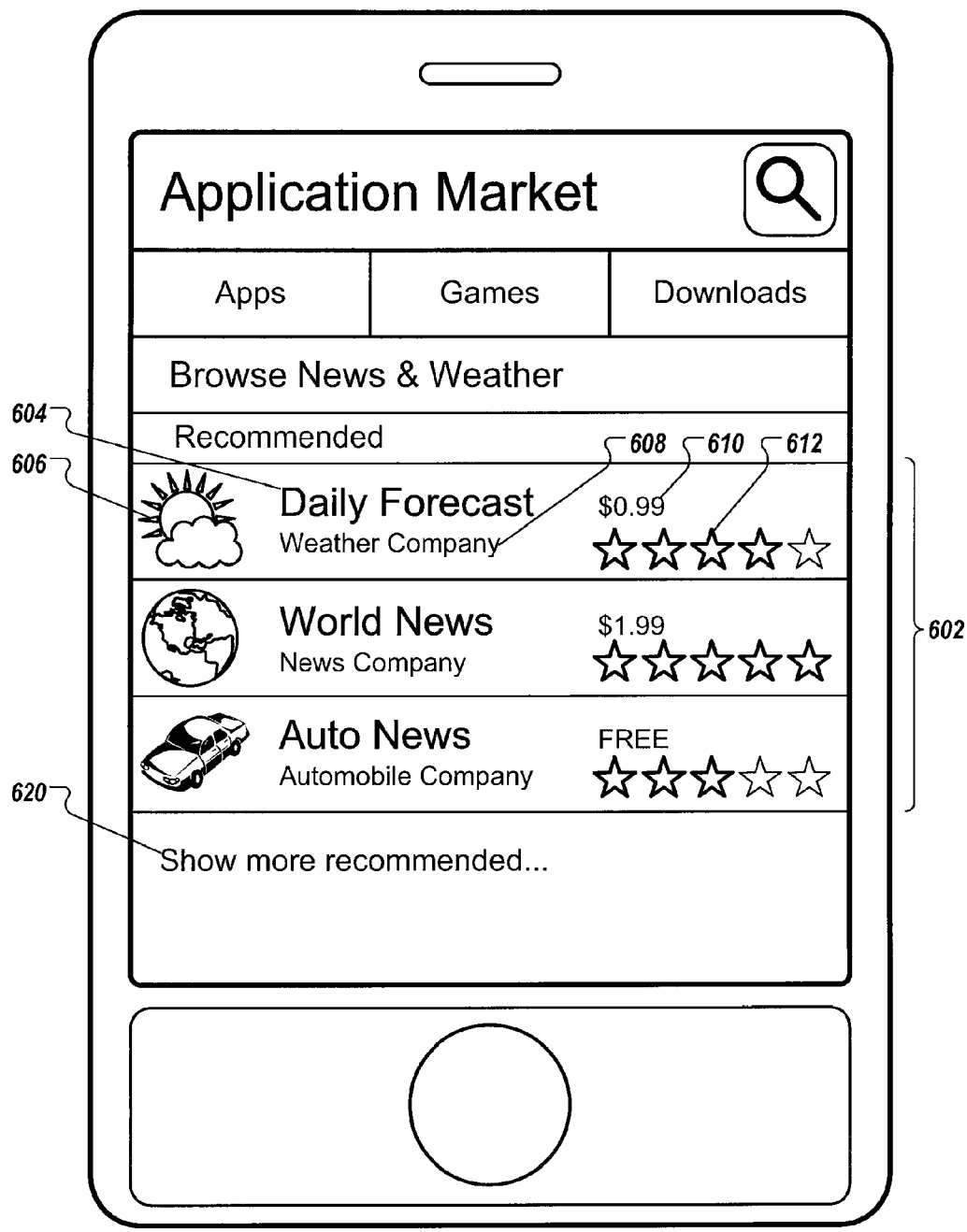
FIG. 6 shows an example interface for presenting application recommendations.

FIG. 6 shows an example interface 600 for presenting application recommendations. The interface 600 may be presented on a mobile device (e.g., any of the devices 102, 104, shown in FIG. 1, and any of the mobile devices 202A-C, shown in FIG. 2) using a web browser, or using an application associated with an application marketplace (e.g., an application associated with the content server 120, shown in FIG. 1), for example.

As shown in FIG. 6, a set of links 602 associated with recommended applications is provided to a device user. For example, application recommendations may be determined by a computer implemented process (e.g., a process executed by the recommendation server 140, shown in FIG. 1, or by the recommendation server 230, shown in FIG. 2), and may be customized for the device user. Each of the links 602 may include information associated with recommended applications, such as a title 604, a graphic 606, a developer (i.e., a company) 608, a price 610, and a rating 612. In some implementations, the rating 612 may be an average rating across a population of users. In some implementations, the rating 612 may be specific to the device user (e.g., based on the user's demographic and/or location information).

In some implementations, application recommendations may be requested by a device user. For example, the interface 600 includes a control 620 for requesting additional recommendations. The set of links 602 may be initially presented to the user (e.g., upon accessing an application marketplace, or a particular marketplace section) and additional links (not shown) may be presented to the user upon interacting with the control 620. In some implementations, links corresponding to applications with high relevance to the device user may be initially presented, and links corresponding to applications with lower relevance to the device user may be subsequently presented.

In some implementations, applications may be obtained by a device user via the interface 600. For example, by selecting (e.g., using a touch screen) any of the links 602, the device user may indicate a preference to view additional information about the application, to download the application, or to purchase the application. In some implementations, an application marketplace may provide information related to user interaction with application links (e.g., the links 602) to systems or processes for maintaining user profiles. For example, user download or purchase of any of the applications associated with any of the links 602 may be provided to the profile server 130 (shown in FIG. 1).

Figure 7:
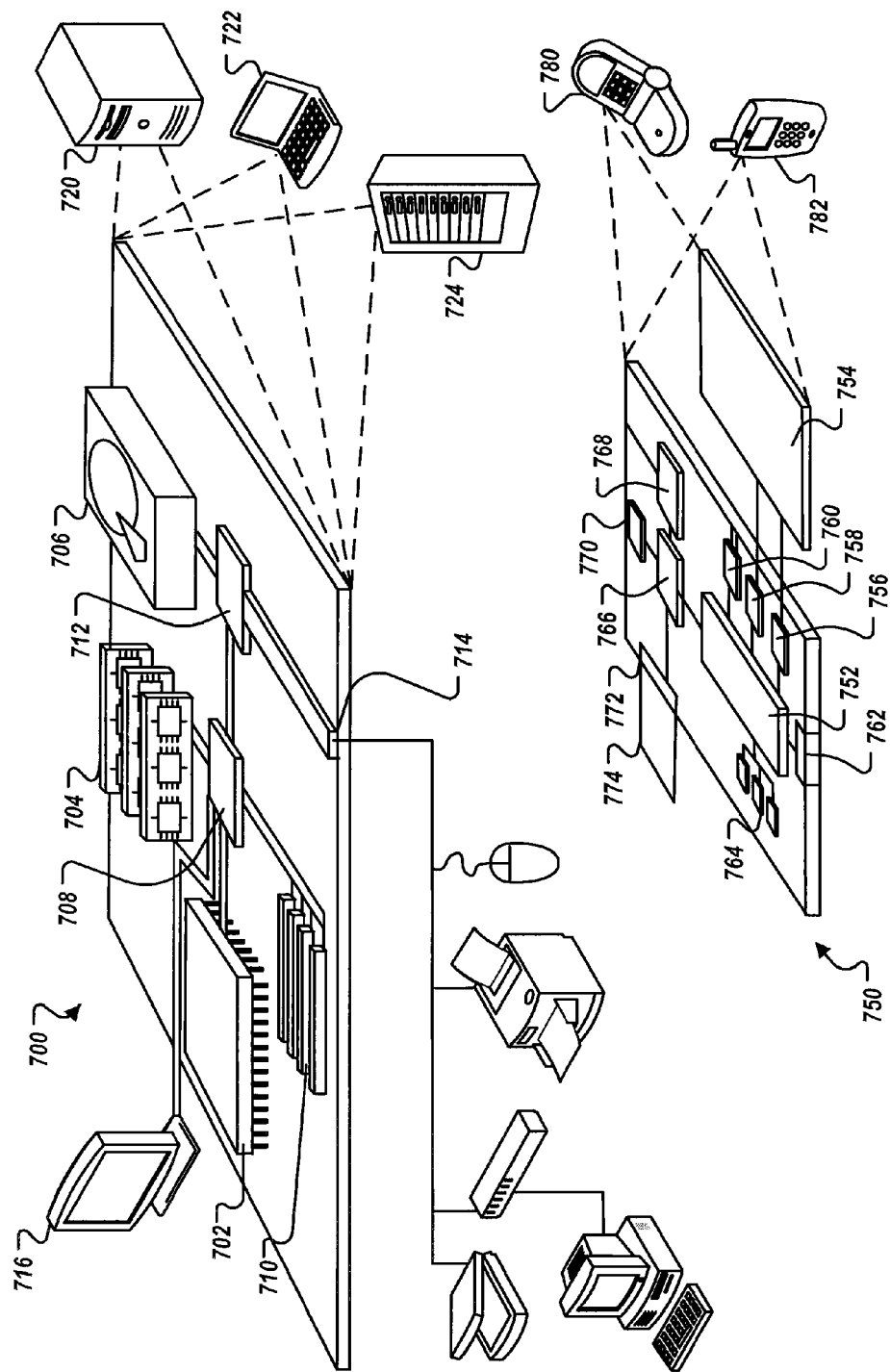
FIG. 7 shows an example of a computer device and a mobile computer device that may be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 may process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 704, the storage device 706, or a memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 may execute instructions within the computing device 650, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 658 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 may be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to television advertisements, but other forms of future, viewership-based advertisements may also be addressed, such as radio advertisements and on-line video advertisements.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
one or more computers; and
a computer-readable medium coupled to the one or more computers having instructions stored thereon which, when executed by the one or more computers, cause the one or more computers to perform operations comprising:
receiving application acquisition data;
receiving location data that references a location of a mobile device;
receiving application data associated with each application available from an online application marketplace, the application data comprising a category of each application and a reputation of a developer of each application;
aggregating the application acquisition data, the location data and the application data to provide aggregated data;
selecting, from among multiple, different applications that are available from the online application marketplace, one or more particular applications based on the aggregated data; and
providing a recommendation to the mobile device, wherein the recommendation identifies the one or more particular applications as applications that a user is likely to be interested in purchasing or downloading.

2. The system of claim 1, the operations further comprising receiving a request for the recommendation from the mobile device.

3. The system of claim 1, wherein:
the operations further comprise:
receiving user profile data; and
filtering the one or more particular applications based on the user profile data,
wherein the recommendation identifies the one or more filtered applications as applications that the user is likely to be interested in purchasing or downloading.

4. The system of claim 3, wherein filtering the one or more particular applications further comprises ranking the one or more particular applications based on category preferences referenced by the user profile data.

5. The system of claim 3, wherein filtering the one or more particular applications further comprises excluding one or more applications that are currently installed on the mobile device, or that have been previously installed on the mobile device and subsequently removed by the user of the mobile device.

6. The system of claim 1, wherein
selecting the one or more particular applications further comprises selecting the one or more particular applications that correlate to applications that are already installed on the mobile device.

7. The system of claim 1, wherein selecting the one or more particular applications further comprises selecting the one or more particular applications that, for other users at or near the location, have an aggregated popularity score above a predetermined threshold.

8. The system of claim 1, wherein the recommendation includes one or more links for purchasing or downloading one or more of the particular applications.

9. The system of claim 1, wherein:
the operations further comprises receiving data that references a characteristic, configuration, or capability of the mobile device,
wherein selecting the one or more particular applications further comprise selecting the one or more particular applications that are relevant to the location and the characteristic, configuration, or capability.

10. The system of claim 1, the operations further comprising determining, when respective scores for the one or more particular applications exceed a threshold, that the one or more particular applications are applications that the user is likely to be interested in purchasing or downloading.

11. A computer storage medium encoded with a computer program, the program comprising instructions that when executed by one or more computers cause the one or more computers to perform operations comprising:
receiving application acquisition data;
receiving location data that references a location of a mobile device;
receiving application data associated with each application available from an online application marketplace, the application data comprising a category of each application and a reputation of a developer of each application;
aggregating the application acquisition data, the location data and the application data to provide aggregated data;
selecting, from among multiple, different applications that are available from the online application marketplace, one or more particular applications based on the aggregated data; and
providing a recommendation to the mobile device, wherein the recommendation identifies the one or more particular applications as applications that a user is likely to be interested in purchasing or downloading.

12. The computer storage medium of claim 11, the operations further comprising receiving a request for the recommendation from the mobile device.

13. The computer storage medium of claim 11, wherein:
the operations further comprise:
receiving user profile data; and
filtering the one or more particular applications based on the user profile data,
wherein the recommendation identifies the one or more filtered applications as applications that the user is likely to be interested in purchasing or downloading.

14. The computer storage medium of claim 13, wherein filtering the one or more particular applications further comprises ranking the one or more particular applications based on category preferences referenced by the user profile data.

15. The computer storage medium of claim 13, wherein filtering the one or more particular applications further comprises excluding one or more applications that are currently installed on the mobile device, or that have been previously installed on the mobile device and subsequently removed by the user of the mobile device.

16. The computer storage medium of claim 11, wherein selecting the one or more particular applications further comprises selecting the one or more particular applications that correlate to applications that are already installed on the mobile device that, for other users in the location, have an aggregated popularity score above a predetermined threshold.

17. The computer storage medium of claim 11, wherein the recommendation includes one or more links for purchasing or downloading one or more of the particular applications.

18. The computer storage medium of claim 11, wherein:
the operations further comprises receiving data that references a characteristic, configuration, or capability of the mobile device,
wherein selecting the one or more particular applications further comprise selecting the one or more particular applications that are relevant to the location and the characteristic, configuration, or capability.

19. A computer-implemented method comprising:
receiving application acquisition data;
receiving location data that references a location of a mobile device;
receiving application data associated with each application available from an online application marketplace, the application data comprising a category of each application and a reputation of a developer of each application;
aggregating the application acquisition data, the location data and the application data to provide aggregated data;
selecting, from among multiple, different applications that are available from the online application marketplace, one or more particular applications based on the aggregated data; and
providing, by a recommendation server, a recommendation to the mobile device, wherein the recommendation identifies the one or more particular applications as applications that a user is likely to be interested in purchasing or downloading.

20. The method of claim 19, the operations further comprising receiving a request for the recommendation from the mobile device.

* * * * *